United States Patent [19]

Watanabe et al.

[11] Patent Number: 5,062,137
[45] Date of Patent: Oct. 29, 1991

[54] METHOD AND APPARATUS FOR SPEECH RECOGNITION

[75] Inventors: Taisuke Watanabe, Sagamihara; Tatsuya Kimura, Kawasaki, both of Japan

[73] Assignee: Matsushita Electric Industrial Co., Ltd., Japan

[21] Appl. No.: 626,405

[22] Filed: Dec. 14, 1990

Related U.S. Application Data

[60] Continuation of Ser. No. 385,523, Jul. 27, 1989, abandoned, which is a division of Ser. No. 167,794, Mar. 14, 1988, abandoned.

[51] Int. Cl.$^5$ .............................................. G10L 5/00
[52] U.S. Cl. ......................................... 381/46; 381/43
[58] Field of Search .................................. 381/41–47

[56] References Cited

U.S. PATENT DOCUMENTS

| | | | |
|---|---|---|---|
| 3,816,722 | 6/1974 | Sakoe et al. | 381/43 |
| 4,712,242 | 12/1987 | Rajasekaran et al. | 381/42 |
| 4,751,737 | 6/1988 | Gerson | 381/42 |

OTHER PUBLICATIONS

Proceedings of ICASSP: "A Telephone Speech Recognition System Using Word Spotting Technique Based on Statistical Measure", by T. Kimura et al, 27.16.1, Apr. 1987, pp. 1175–1178.

Primary Examiner—Emanuel S. Kemeny
Attorney, Agent, or Firm—Lowe, Price, LeBlanc & Becker

[57] ABSTRACT

Power information from an input signal is used to detect the presence of speech. A reference point is established by the power information as the moment of detection of the start of speech. The end of a processing period for speech recognition is determined by a power information occurring after end of speech, so that feature parameters are extracted from the signal during the processing period having start and end points determined by the power information. Standard speech patterns of particular preset words are determined and similarities between the extracted feature parameters and the standard patterns are calculated and mutually compared. The selected preset word corresponds to a maximum of the similarities obtained during the processing period selected in accordance with the power information. The selected word is then outputted as the recognition result. Selection of the process time in accordance with the power information permits exclusion of some similarities in the speech recognition process, thereby preventing erroneous recognition which could occur in a long word having a portion similar to a short word.

3 Claims, 3 Drawing Sheets

METHOD AND APPARATUS FOR SPEECH RECOGNITION

This application is a continuation of application Ser. No. 07/385,523 filed July 27, 1989, which is a divisional application of Ser. No. 07/167,794 filed Mar. 14, 1988.

BACKGROUND OF THE INVENTION

This invention relates to a method and an apparatus for speech recognition.

Some speech recognition systems require voices of a user to be preregistered. The preregistered voices are used as references in recognizing the contents of speech of the user.

Advanced speech recognition systems dispense with such voice preregistration and are usable by unspecified persons. The advanced systems include a word dictionary which holds standard voices in the form of parameters. During a speech recognition process, the patterns of input voices are compared with the pattern of standard voices.

"Simple Speech Recognition Method for Unspecified Speakers" by Niyada et al., in Meeting of the Acoustical Society of Japan, pp 7-8 (March 1986), discloses one example of such an advanced speech recognition system.

SUMMARY OF THE INVENTION

It is an object of this invention to provide accurate method and apparatus for speech recognition.

In this invention, presence of speech is detected from an input signal by use of power information. A moment of the detection of a power level representative of starting of the speech is set as a reference point. The input signal during a period between the reference point and a subsequent point distant from the reference point by N ($N1 \leq N \leq N2$) is linearly changed to a corresponding signal having a period L. Feature parameters are extracted from the signal having the period L. Standard patterns of speeches of respective preset words are predetermined. Similarities between the extracted feature parameters and the standard patterns are calculated and mutually compared. In an interval between N1 and N2, a range of N for each reference point is determined by use of power information available before the reference point. The previously-mentioned steps are performed while N is varied in the determined range. Similar steps are performed as the reference point is shifted by a unit period, and similarities are calculated and mutually compared. A duration of a speech is detected by use of movement of the power information. A process end time is determined by use of the speech duration time and a time-dependent variation in the similarities. The process time for performing speech recognition thus corresponds to a time period starting with start of speech and ending after end of speech. One of the preset words is selected which corresponds to a maximum of the similarities obtained when the reference point reaches the process end time. Selection of the process time in accordance with the power information permits exclusion of some similarities in recognition of the speech, thereby preventing erroneous recognition which could occur in a long word having a portion similar to a short word. The selected word is outputted as recognition result.

THEORETICAL BACKGROUND

Figure 1:
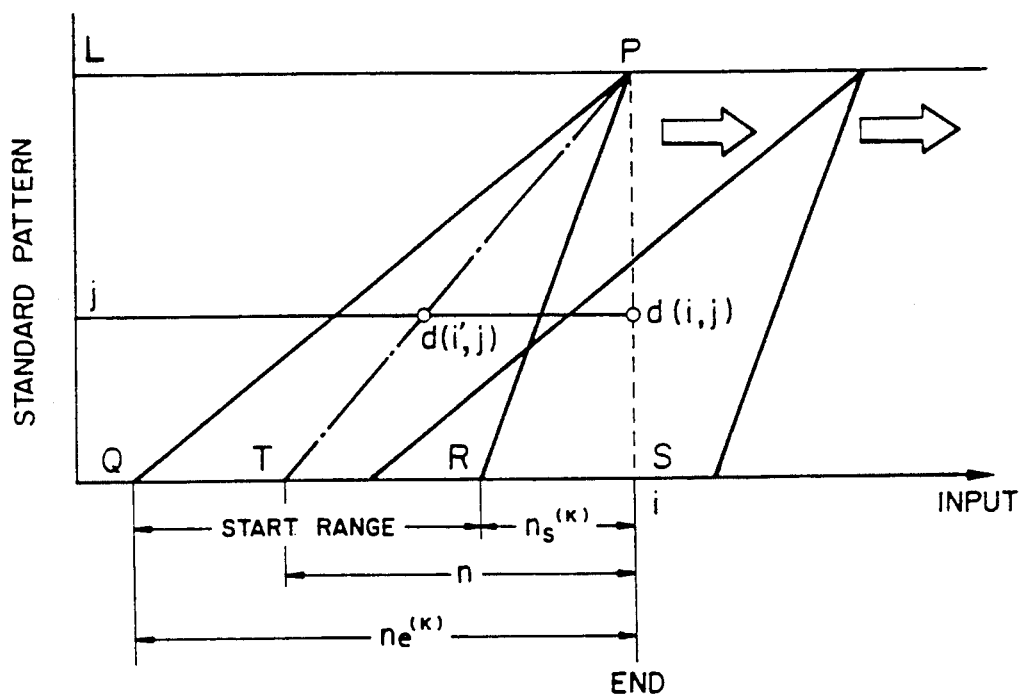
FIG. 1 is a diagram showing a process of calculation of similarities.

In cases where the speech length of an input word is linearly expanded or compressed to L frames and a parameter vector for one frame is expressed by x j, the input vector X is given as:

$$X = (x1, x2, \ldots, xL)$$

where each vector x j has dimensions p.

When standard patterns of preset words $\omega k$ ($k = 1, 2, \ldots, K$) are defined by average value vectors y k and covariance matrixes W k, the recognition result is given by one of the preset words which maximizes a posteriori probability $P(\omega k | X)$.

Bayes' theorem induces the following equation.

$$P(\omega k | X) = P(\omega k) \cdot P(X | \omega k) / P(X) \qquad (1)$$

where the value $P(\omega k)$ is regarded as a constant. When a normal distribution is assumed, the following equation is given.

$$P(X | \omega k) = \qquad (2)$$
$$(2\pi)^{-d/2} |W k|^{-1/2} \cdot \exp\{-1/2(X - y k) \cdot W k^{-1} \cdot (X - y k)\}$$

It is assumed that the value P(X) follows a normal distribution of the average value vectors y k and the covariance matrixes W k. Thus, the value P(X) is given as:

$$P(X) = \qquad (3)$$
$$(2\pi)^{-d/2} |W x|^{-1/2} \cdot \exp\{-1/2(X - y x) \cdot W x^{-1} \cdot (X - y x)\}$$

The logarithm of the equation (1) is denoted by L k and the constant terms are omitted, where:

$$Lk = (X - yk) \cdot Wk^{-1} \cdot (X - yk) - (X - yx) \cdot Wx^{-1} \cdot (X - yx) + \log |Wk| |Wx| \qquad (4)$$

It is assumed that the matrixes W k and W x are in common and they are given by the same matrix W, where:

$$W = (W1 + W2 + \ldots + Wk + Wx)/(K + 1) \qquad (5)$$

When the equation (4) is developed, the following equation is obtained.

$$Lk = Bk - Ak \cdot X \qquad (6)$$

where:

$$Ak = 2(W^{-1} \cdot yk - W^{-1} \cdot yx) \qquad (7)$$

$$Bk = yk \cdot W^{-1} \cdot yk - yx \cdot W^{-1} \cdot yz \qquad (8)$$

When $A_k = (a1^{(k)}, a2^{(k)}, \ldots, aJ^{(k)})$, the equation (6) is transformed into the following equation.

$$Lk = Bk - \sum_{j=1}^{J}(a_j^{(k)} \cdot x_j) = Bk - \sum_{j=1}^{J} d_j^{(k)} \quad (9)$$

where the character Bk denotes a bias constant and the character $d_j^{(k)}$ denotes the partial similarity for the frame k.

The calculation of the final similarity Lk is simplified as described hereinafter.

As shown in FIG. 1, in the case of collation between an input and a word k, a partial period length n ($ns^{(k)} < n < ne^{(k)}$) is linearly expanded and compressed (extended and contracted) to a standard pattern length J, and similarities are calculated at fixed ends for respective frames. A similarity Lk is calculated along a route from a point T in a line QR to a point P by referring to the equation (9).

Accordingly, the calculation of the similarities for one frame is performed within a range ΔPQR. Since the values x j in the equation (9) mean j-th frame components after the expansion and compression of a period length n, a corresponding input frame i' is present. Thus, partial similarities $d_j^{(k)}$ are expressed by use of an input vector and are specifically given as:

$$d^{(k)}(i',j) = a_j^{(k)} \cdot xi \quad (10)$$

$$i' = i - rn(j) + 1 \quad (11)$$

where the character rn(j) represents a function between the lengths n and j. Accordingly, provided that partial similarities between respective frames of an input and standard patterns a $j^{(k)}$ are predetermined, the equation (9) can be easily calculated by selecting and adding the partial similarities having portions related to the frame i'. In view of the fact that the range ΔPQR moves rightwards every frame, partial similarities between the vectors a $j^{(k)}$ and x i are calculated on the line PS, and their components corresponding to the range ΔPQS are stored in a memory and are shifted every frame. In this case, necessary similarities are all present in the memory, repetitive processes in similarity calculation are prevented.

DESCRIPTION OF THE PREFERRED EMBODIMENT

Figure 2:
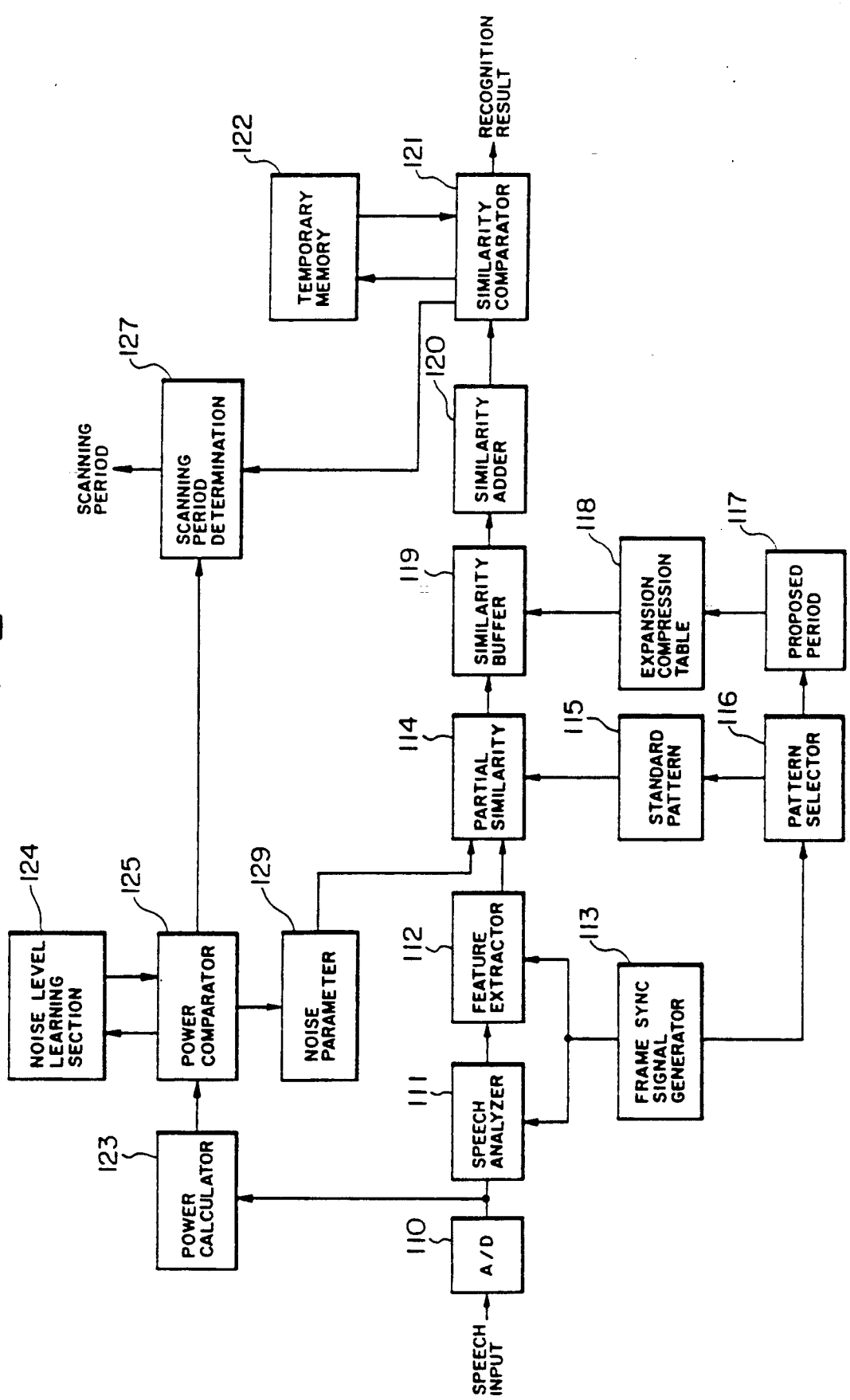
FIG. 2 is a block diagram of a speech recognition apparatus according to an embodiment of this invention.

With reference to FIG. 2, a speech recognition apparatus according to a third embodiment of this invention includes an analog-to-digital (A/D) converter 110 which changes an input analog speech signal to a corresponding digital speech signal having 12 bits. In the A/D converter 110, the input analog speech signal is sampled at a frequency of 8 KHz. The digital speech signal is outputted from the A/D converter 110 to a speech analyzer 111 and a power calculator 123. In the speech analyzer 111, the digital speech signal is subjected to LPC analyzation every 10 msec (one frame) so that 10-th order linear prediction coefficients and residual powers are derived. A feature parameter extractor 112 calculates LPC cepstrum coefficients c1–c9 and a power term c0 from the linear prediction coefficients and the residual powers. The calculated LPC cepstrum coefficients and power term constitute feature parameters. Accordingly, a feature vector x for a frame is given as:

$$x^t = (c0, c1, \ldots, c9) \quad (12)$$

LPC analyzation and ways of extracting LPC cepstrum coefficients are disclosed in various books such as "Linear Prediction of Speech" written by J. D. Markel and A. H. Gray, Jr., published from Springer-Verlag Berlin Heidelberg in 1976.

A frame sync signal generator 113 outputs timing signals (frame signals) at intervals of 10 msec. A speech recognition process is performed synchronously with the frame signals. The frame signals are applied to the speech analyzer 111 and the feature parameter extractor 112. The sync signal generator 113 also outputs a timing signal to a standard pattern selector 116.

A standard pattern storage 115 holds standard patterns of words identified by numbers $k = 1, 2, \ldots, K$. The standard pattern selector 116 outputs a signal to the standard pattern storage 115 in synchronism with the timing signal. During a one-frame interval, the output signal from the standard pattern selector 116 represents sequentially the word numbers $k = 1, 2, \ldots, K$ so that the standard patterns corresponding to the word numbers $k = 1, 2, \ldots, K$ are sequentially selected and transferred from the standard pattern storage 115 to a partial similarity calcualtor 114. The partial similarity calculator 114 determines a parial similarity $d^{(k)}(i,j)$ between a selected standard pattern a $j^{(k)}$ and a feature vector x i by referring to the following equation.

$$d^{(k)}(i,j) = a_j^{(k)t} \cdot x i \quad (13)$$
$$(j = 1, 2, \ldots, L)$$

The calculated partial similarity is transferred to and stored in a similarity buffer 119. The similarity buffer 119 holds a set of successive partial similarities. Each time the newest partial similarity is transferred to the similarity buffer 119, the oldest partial similarity is erased from the similarity buffer 119.

As shown in FIG. 2, the word number signal outputted from the standard pattern selector 116 is also applied to a proposed period setting section 117. The proposed period setting section 117 sets a minimal length $ns^{(k)}$ and a maximal length $ne^{(k)}$ of a word designated by the word number signal. The minimal length and the maximal length of the word are fed to a memory 118 holding the relationships of the equation (11) in a table form. When a word length n ($ns^{(k)} \leq n \leq ne^{(k)}$) and a frame j are designated, the corresponding value i' is derived and is outputted from the memory 118 to the similarity buffer 119. The values i' are read out from the memory 118 for respective word lengths n in the range of $ns^{(k)} \leq n \leq ne^{(k)}$, and the similarities $d^{(k)}(i',j)$, $j = 1, 2, \ldots$, corresponding to the values i' are transferred from the similarity buffer 119 to a similarity adder 120.

The similarity adder 120 derives a final similarity or likelihood Lk from the partial similarities $d^{(k)}(i',j)$ and a constant Bk by referring to the equation (9). The derived final similarity Lk is outputted to a similarity comparator 121.

The similarity comparator 121 selects the greater of the input similarity and a similarity fed from a temporary memory 122. The selected greater similarity is stored into the temporary memory 122 so that the similarity held by the memory 122 is updated.

During a start, a first frame i = i0 is processed. Specifically, the greatest similarity $maxL1^{i0}$ is determined in the range of $ns^{(1)} \leq n \leq ne^{(1)}$ with respect to a standard pattern k=1. Then, the greatest similarity maxL2$^{i0}$ is determined in the range of ns$^{(2)}$≤n≤ne$^{(2)}$ with respect to a standard pattern k=2. The similarity maxL2$^{i0}$ is compared with the similarity maxL1$^{i0}$, and the greater of the compared similarities is selected. Similar processes are repeated for the respective standard patterns k=3, ... ,K. As a result, the actually greatest similarity maxLk'$^{i0}$ is determined. The greatest similarity maxLk'$^{i0}$ and the corresponding word number k' are stored into the temporary memory 122.

During a stage following the start, subsequent frames i=i0+Δi are processed in a way similar to the way of processing the first frame. After a final frame i=I is processed, the word number k=km held in the temporary memory 122 represents the result of speech recognition.

Figure 3:
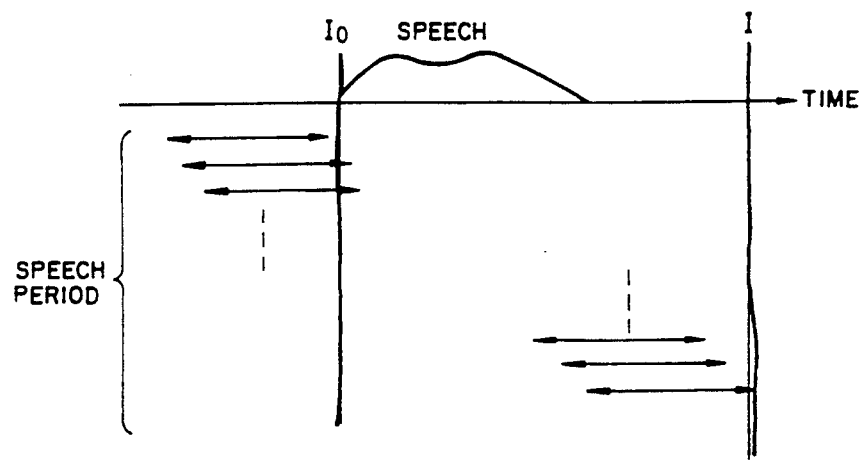
FIG. 3 is a diagram showing the relationship among speech, speech period, start of scan, and end of scan in the speech recognition apparatus of FIG. 2.

As shown in FIG. 3, the scanning start frame I0 occurs simultaneously with a start of a speech, and the recognition completion frame I occurs after an end of the speech.

In this embodiment, a start of a scanning period is derived from power information while an end of the scanning period is derived from power information and similarity information. In addition, control of speech periods uses power information.

Returning to FIG. 2, the power calculator 123 derives poweres (logarithmic values) for respective frames of the digital speech signal. The calculated powers are outputted to a power comparator 125. The power comparator 125 compares the poweres with a variable threshold level which has a given relationship with a mean noise level supplied from a noise level learning section 124. The functions of the power comparator 125 and the noise level learning section 124 will be described in detail hereinafter.

Figure 4:
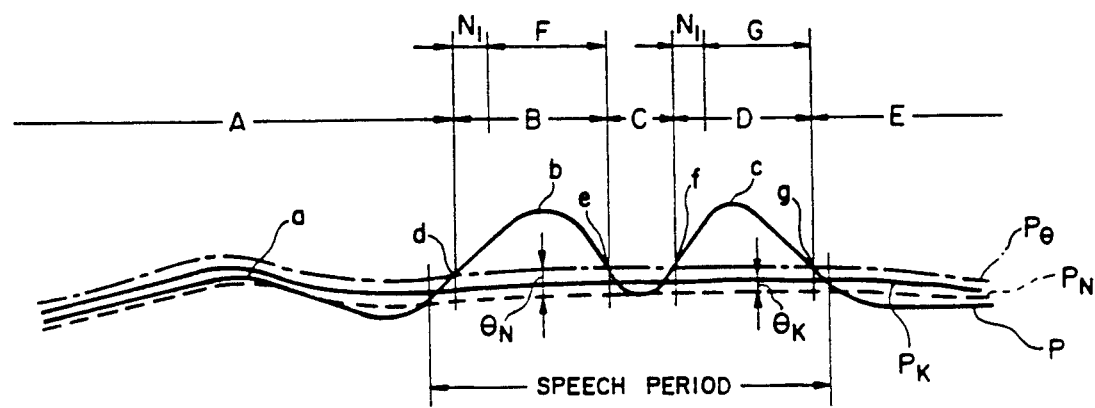
FIG. 4 is a diagram of time-dependent variations in speech and various parameters used in the speech recognition apparatus of FIG. 2.

FIG. 4 shows an example of time-dependent variations in power (logarithmic value) and other parameters. In this example, the power level has three peaks a, b, and c. It is assumed that the peak a is caused by noise and is thus unwanted. In FIG. 4, the dash line denotes a mean noise level (PN) and the dot-dash line denotes a threshold level (Pθ) which remains greater than the mean noise level PN by a constant value θN. The mean noise level PN is given as:

$$PN = (1/M) \sum_{m=1}^{M} Pm \quad (14)$$

where the character Pm represents the power of a m-th frame which is equal to or smaller than the threshold level. Thus, the mean noise level PN equals a mean value of powers of frames which are equal to or smaller than the threshold level. As shown in FIG. 4, the waveform of the mean noise level PN is approximately equal to a waveform obtained by smoothing the levels of the poweres. The mean noise level PN and the threshold level Pθ have the following relationship.

$$Pθ = PN + θN \quad (15)$$

Speech detection performed by the combination of the power comparator 125 and the noise level learning section 124 will be described hereinafter with reference to FIG. 4. The power of a start of a signal is set to an initial noise level. While the mean noise level PN is calculated by the equation (14), the power level P is compared with the threshold level Pθ. Since the first power peak a is smaller than the threshold level Pθ, it is not detected as speech. When the power level P rises to and above the threshold level Pθ at a point d in a leading slope of the second power peak b, the calculation by the equation (14) is interrupted. The calculation by the equation (14) remains interrupted and the values PN and Pθ are held constant until the power level P drops to the threshold level Pθ at a point e in a trailing slope of the second power peak b. This period corresponds to the interval B between the points d and e. At the point e, the calculation by the equation (14) is restarted. During the interval C between the point e and a subsequent point f, the power level P remains equal to or smaller than the threshold level Pθ, the calculation by the equation (14) continues. During the interval D between the point f and a subsequent point g in the third power peak c, the power level P remains greater than the threshold level Pθ so that the values PN and Pθ are held constant. The intervals B and D where the power level P remains greater than the threshold level Pθ are judged as periods where speech is present.

Returning to FIG. 2, the power comparator 125 compares the power level P and the threshold level Pθ and outputs sequentially the results of comparison in respective frames to an excluded period determination section 126. In the example of FIG. 4, during the period until the point d, the results of P<Pθ are transferred. At the point d where the power level P rises to the threshold level Pθ, a frame counter within the excluded period determination section 126 is started by a signal from the power comparator 125. During the period between the points d and e where the condition "P>Pθ" continues, the counter within the excluded period determination section 126 counts the number of frames. At the point e where the power level P drops to the threshold level Pθ, the counter within the excluded period determination section 126 is reset by a signal from the power comparator 125. In this way, the excluded period determination section 126 detects the number of frames which occur during the interval where the condition "P>Pθ" continues. When the final count number N is greater than a predetermined number N1, the excluded period determination section 126 outputs a signal "1" to the partial similarity calculator 114. In other cases, the excluded period determination section 126 outputs a signal "0" to the partial similarity calculator 114. In the example of FIG. 7, the excluded period determination section 126 continues to output the signal "1" during intervals F and G which follow the points d and f by the N1 frames. The signal "1" outputted from the excluded period determination section 126 represents that the related periods F and G do not correspond to initial portions of the speech periods.

When the output signal from the excluded period determination section 126 is "0", the partial similarity calculator 114 determines the partial similarities d$^{(k)}$(i,j) on the basis of the equation (13). When the output signal from the excluded period determination section 126 is "1", the partial similarity calculator 114 determines the paritial similarities d$^{(k)}$(i,j) by referring to the following equations.

$$d^{(k)}(i,j) = \text{CONS} \quad (j = 1) \quad (16)$$
$$d^{(k)}(i,j) = a_j^{(k)t} \cdot x_i \quad (j = 2,3, \ldots ,L)$$

where the character i represents the frame number; the character k represents the standard pattern number; the character j represents the linear expansion compression number; and the character CONS represents a negative small constant. Accordingly, all the similarities with the i-th frame forming the start of a speech period include the negative small constant CONS, so that they are small relative to the others and do not correspond to the maximal similarity. Thus, such similarities are excluded in speech recognition. This similarity exclusion prevents wrong speech recognition which could occur in a long word having a portion similar to a short word.

A scanning period setting section 127 receives signals from the power comparator 125 and the similarity comparator 121. When the power level P increases above the threshold level $P\theta$ (at the point d of FIG. 4), the scanning period setting section 127 starts scan at the frame I0 (see FIG. 3). In cases where the condition "$P \leq P\theta$" continues for H frames and the maximal similarity available theretofore is equal to or greater than a reference after the condition "$P > P\theta$" occurred, the scan is terminated at the frame I.

What is claimed is:

1. A method of speech recognition comprising the steps of:
    (a) detecting presence of speech from an input signal by use of power information;
    (b) setting a moment of the detection of the speech as a reference point;
    (c) linearly changing the input signal during a period between the reference point and a subsequent point distant from the reference point by N ($N1 \leq N \leq N2$) to a corresponding signal having a period L;
    (d) extracting feature parameters from the signal having the period L;
    (e) predetermining standard patterns of speeches of respective preset words;
    (f) calculating similarities between the extracted feature parameters and the standard patterns;
    (g) comparing the calculated similarities;
    (h) in an interval between N1 and N2, determining a range of N for each reference point by use of power information available before the reference point;
    (i) performing the previously-mentioned steps while varying N in the determined range;
    (j) performing similar steps as the reference point is shifted by a unit period, and calculating similarities and comparing the similarities;
    (k) detecting a duration of a speech by use of movement of the power information;
    (l) determining a process end time by use of the speech duration time and a time-dependent variation in the similarities;
    (m) selecting one of the preset words which corresponds to a maximum of the similarities obtained when the reference point reaches the process end time; and
    (n) outputting the selected word as recognition result.

2. The method of claim 1 wherein the speech detecting step comprises detecting the speech by use of a ratio between a speech signal and a noise.

3. The method of claim 1 wherein the similarity calculating step comprises calculating the similarities on the basis of a statistical scale.

* * * * *

UNITED STATES PATENT AND TRADEMARK OFFICE
CERTIFICATE OF CORRECTION

PATENT NO. : 5,062,137

DATED : October 29, 1991

INVENTOR(S) : Taisuke WATANABE and Tatsuya KIMURA

It is certified that error appears in the above-identified patent and that said Letters Patent is hereby corrected as shown below:

On the title page:

After Item [22] insert the foreign application priority data as follows:

--[30]  Foreign Application Priority Data

Mar. 13, 1987   [JP]    Japan.........62-59407
      Mar. 13, 1987   [JP]    Japan.........62-59413
      Mar. 23, 1987   [JP]    Japan.........62-68436
      Mar. 24, 1987   [JP]    Japan.........62-69344 --

Signed and Sealed this

Thirtieth Day of March, 1993

*Attest:*

STEPHEN G. KUNIN

*Attesting Officer*      *Acting Commissioner of Patents and Trademarks*